US012441857B2

(12) United States Patent
Takasugi

(10) Patent No.: US 12,441,857 B2
(45) Date of Patent: Oct. 14, 2025

(54) POLYETHYLENE FILM, LAMINATE AND PACKAGE USING THE SAME

(71) Applicant: Dai Nippon Printing Co., Ltd., Tokyo (JP)

(72) Inventor: Yuya Takasugi, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 764 days.

(21) Appl. No.: 15/747,924

(22) PCT Filed: Jul. 28, 2016

(86) PCT No.: PCT/JP2016/072153
§ 371 (c)(1),
(2) Date: Jan. 26, 2018

(87) PCT Pub. No.: WO2017/018479
PCT Pub. Date: Feb. 2, 2017

(65) Prior Publication Data
US 2018/0215884 A1 Aug. 2, 2018

(30) Foreign Application Priority Data

Jul. 28, 2015 (JP) .................................. 2015148954
Jul. 28, 2015 (JP) .................................. 2015148956
(Continued)

(51) Int. Cl.
*C08J 7/12* (2006.01)
*B32B 27/08* (2006.01)
(Continued)

(52) U.S. Cl.
CPC .............. *C08J 7/123* (2013.01); *B32B 27/08* (2013.01); *B32B 27/16* (2013.01); *B32B 27/32* (2013.01);
(Continued)

(58) Field of Classification Search
CPC ....... C08J 7/00; C08J 7/123; C08J 5/18; C08J 2323/06; C08J 2425/04; B65D 65/40;
(Continued)

(56) References Cited

U.S. PATENT DOCUMENTS 4,863,768 A   9/1989  Ishio et al.
4,985,188 A   1/1991  Ishio et al.
(Continued)

FOREIGN PATENT DOCUMENTS

EP    0 369 705 A2    5/1990
JP    S51-126269 A1   11/1976
(Continued)

OTHER PUBLICATIONS

English translation of International Preliminary Report on Patentability (Chapter I) (Application No. PCT/JP2016/072153) dated Jan. 30, 2018, 16 pages.
(Continued)

*Primary Examiner* — Samir Shah
(74) *Attorney, Agent, or Firm* — BURR PATENT LAW, PLLC

(57) ABSTRACT

There is provided a polyethylene film and a laminate which can be used to produce a package having high heat resistance, strength and recycling suitability in place of a lamination film conventionally used in a package. The polyethylene film of the present invention is irradiated with an electron beam on its only one side, and comprises polyethylene and a crosslinking agent, in which the crosslink density of the polyethylene is different between the side irradiated with an electron beam and the other side not irradiated with an electron beam.

2 Claims, 3 Drawing Sheets

(30) Foreign Application Priority Data

| Jul. 28, 2015 | (JP) | ................... | 2015148958 |
|---|---|---|---|
| Jul. 28, 2015 | (JP) | ................... | 2015148963 |
| Jul. 14, 2016 | (JP) | ................... | 2016139634 |
| Jul. 14, 2016 | (JP) | ................... | 2016139636 |
| Jul. 14, 2016 | (JP) | ................... | 2016139644 |
| Jul. 14, 2016 | (JP) | ................... | 2016139652 |

(51) Int. Cl.
    *B32B 27/16*     (2006.01)
    *B32B 27/32*     (2006.01)
    *B65D 65/40*     (2006.01)
    *C08J 5/18*     (2006.01)
    *C08J 7/00*     (2006.01)

(52) U.S. Cl.
    CPC ............... *B65D 65/40* (2013.01); *C08J 5/18* (2013.01); *C08J 7/00* (2013.01); *B32B 2250/02* (2013.01); *B32B 2307/31* (2013.01); *B32B 2307/72* (2013.01); *B32B 2323/046* (2013.01); *B32B 2439/00* (2013.01); *C08J 2323/06* (2013.01); *C08J 2425/04* (2013.01); *Y02W 30/80* (2015.05)

(58) Field of Classification Search
    CPC ......... B32B 27/32; B32B 27/16; B32B 27/08; B32B 2439/00; B32B 2307/72; B32B 2323/046; B32B 2250/02; B32B 2307/31; Y02W 30/805; Y02W 30/80
    See application file for complete search history.

(56) References Cited

U.S. PATENT DOCUMENTS

| 5,185,203 | A | * | 2/1993 | Itaba | ................ | B32B 27/32 |
| | | | | | | 428/349 |
| 5,223,311 | A | * | 6/1993 | Tsutsumi | ......... | C09D 123/0815 |
| | | | | | | 428/513 |
| 5,614,297 | A | * | 3/1997 | Velazquez | ............... | B32B 27/32 |
| | | | | | | 428/212 |
| 6,051,292 | A | | 4/2000 | Lind et al. | | |
| 6,720,097 | B2 | * | 4/2004 | Ohkawa | ................ | C23C 16/401 |
| | | | | | | 428/701 |
| 6,753,054 | B1 | | 6/2004 | Lind et al. | | |
| 2011/0256378 | A1 | | 10/2011 | Collins et al. | | |
| 2015/0035720 | A1 | * | 2/2015 | Schrauwen | ............... | H01Q 1/36 |
| | | | | | | 343/904 |
| 2018/0215884 | A1 | | 8/2018 | Takasugi | | |

FOREIGN PATENT DOCUMENTS

| JP | S64-500180 | A1 | 1/1989 |
|---|---|---|---|
| JP | H04-043032 | A1 | 2/1992 |
| JP | H07-096586 | A1 | 4/1995 |
| JP | H07-266513 | A1 | 10/1995 |
| JP | H08-066992 | A1 | 3/1996 |
| JP | 2001-001468 | A1 | 1/2001 |
| JP | 2005-104525 | A1 | 4/2005 |
| JP | 2005-225118 | A1 | 8/2005 |
| JP | 2011-073337 | A1 | 4/2011 |
| JP | 2011-074261 | A1 | 4/2011 |
| JP | 2013-523997 | A1 | 6/2013 |
| JP | 2013-177531 | A1 | 9/2013 |
| JP | 2016-021433 | A1 | 2/2016 |
| JP | 2017-024181 | A1 | 2/2017 |
| JP | 2018-008453 | A1 | 1/2018 |
| JP | 2018-008454 | A1 | 1/2018 |
| JP | 2018-008455 | A1 | 1/2018 |
| JP | 2018-008456 | A1 | 1/2018 |

OTHER PUBLICATIONS

International Search Report and Written Opinion (Application No. PCT/JP2016/072153) dated Aug. 23, 2016.
Japanese Office Action (Application No., 2015-148963) dated Jun. 14, 2019 (with English translation).
Japanese Office Action (Application No. 2015-148954) dated May 10, 2019 (with English translation).
Japanese Office Action (Application No. 2015-148958) dated May 10, 2019 (with English translation).
Japanese Office Action (Application No. 2015-148956) dated May 28, 2019 (with English translation).
Extended European Search Report (Application No. 16830584.5) dated Feb. 20, 2019.
Japanese Office Action (Application No. 2015-148954) dated Jan. 7, 2020 (with English translation).
Japanese Office Action (Application No. 2016-139634) dated Feb. 4, 2020 (with English translation).
Japanese Office Action (Application No. 2016-139636) dated Feb. 4, 2020 (with English translation).
Japanese Office Action (Application No. 2016-139644) dated Feb. 4, 2020 (with English translation).
Japanese Office Action (Application No. 2016-139652) dated Feb. 4, 2020 (with English translation).
Japanese Office Action (Application No. 2015-148958) dated Dec. 13, 2019 (with English translation).
Japanese Office Action (Application No. 2016-139634) dated Jul. 31, 2020.
Japanese Office Action (Application No. 2016-139636) dated Jul. 31, 2020.
Japanese Office Action (Application No. 2016-139644) dated Jul. 31, 2020.
Japanese Office Action (Application No. 2016-139652) dated Jul. 31, 2020.
Indonesian Office Action (Application No. PID201801266) dated Jun. 8, 2020 (with English translation).

* cited by examiner

POLYETHYLENE FILM, LAMINATE AND PACKAGE USING THE SAME

BACKGROUND OF THE INVENTION

Field of the Invention

The present invention relates to a polyethylene film, and more particularly, to a single-layer polyethylene film having different physical properties on its front and back sides, and a package using the polyethylene film.

The present invention also relates to a laminate, and more particularly, to a laminate comprising a polyethylene film substrate that is irradiated with an electron beam on its both sides and a polyethylene film layer that is not irradiated with an electron beam on its at least one side, and a package using the laminate.

Description of Related Art

Films made of polyethylene have moderate flexibility, are excellent in, for example, transparency, moisture resistance and chemical resistance, and are inexpensive, and thus they are used for various packaging materials. In particular, since the melting point of polyethylene, which varies in some degree depending on its kind, is generally about 100 to 140° C., polyethylene is generally used as a sealant film in the field of packaging materials.

On the other hand, polyethylene is inferior in heat resistance and also insufficient in strength as compared with other thermoplastic resins. Thus, when polyethylene is used as a packaging material, it is used as a lamination film obtained by laminating a resin film, such as a polyester film and a nylon film, excellent in heat resistance and strength and a polyethylene film. A package is manufactured by heat-sealing the edge of the lamination film so that the polyethylene film side is inside of the package (for example, Japanese Laid-open Patent Application (Kokai) No. 2005-104525).

In recent years, there has been an increasing demand for construction of a recycling-oriented society, and along with this, recycling of packaging materials has been attempted. However, a lamination film obtained by laminating different kinds of resin films as described above has had a problem that it is not suitable for recycling because of the difficulty in being separated for each resin type.

PRIOR ART REFERENCES

Patent Documents

Patent Document 1: Japanese Laid-open Patent Application (Kokai) No. 2005-104525

SUMMARY OF THE INVENTION

Problems to be Solved by the Invention

The present inventors have now found that irradiation of an electron beam to a polyethylene film can occur curing or crosslinking of polyethylene near the film surface irradiated with the electron beam.

In addition, it was found that use of a polyethylene film irradiated with an electron beam, using only a polyethylene film instead of a laminate obtained by laminating different resin films conventionally used in a package, can provide a package suitable for recycling as well as having high heat resistance and strength. The present invention is based on this finding.

Thus, an object of the present invention is to provide a polyethylene film and a laminate which can be used to produce a package having high heat resistance, strength and recycling suitability in place of a lamination film conventionally used in a package. Another object of the present invention is to provide a package using such a polyethylene film and a laminate.

Means for Solving the Problems

In one embodiment, the polyethylene film of the present invention is irradiated with an electron beam on its only one side and comprises polyethylene and a crosslinking agent, wherein the crosslink density of the polyethylene is different between the side irradiated with the electron beam and the other side not irradiated with the electron beam.

In one embodiment, the polyethylene film of the present invention is irradiated with an electron beam on its only one side and comprises a low-density polyethylene having a density of 0.91 $g/cm^3$ or less, wherein the crosslink density of the polyethylene is different between the side irradiated with the electron beam and the other side not irradiated with the electron beam.

In one embodiment, the polyethylene film of the present invention is irradiated with an electron beam on its only one side and comprises polyethylene and a light stabilizer, wherein the crosslink density of the polyethylene is different between the side irradiated with the electron beam and the other side not irradiated with the electron beam.

In one embodiment, the laminate of the present invention comprises a polyethylene film substrate and a polyethylene film layer, wherein the polyethylene film substrate is irradiated with an electron beam on its both sides and comprises polyethylene and a crosslinking agent, and wherein the polyethylene film layer is not irradiated with an electron beam on at least the side opposite to the side of the polyethylene film substrate and has heat sealability.

In one embodiment, the laminate of the present invention comprises a polyethylene film substrate and a polyethylene film layer, wherein the polyethylene film substrate is irradiated with an electron beam on its both sides and comprises a low-density polyethylene having a density of 0.91 $g/cm^3$ or less, and wherein the polyethylene film layer is not irradiated with an electron beam on at least the side opposite to the side of the polyethylene film substrate and has heat sealability.

In one embodiment, the laminate of the present invention comprises a polyethylene film substrate and a polyethylene film layer, wherein the polyethylene film substrate is irradiated with an electron beam on its both sides and comprises polyethylene and a light stabilizer, and wherein the polyethylene film layer is not irradiated with an electron beam on at least the side opposite to the side of the polyethylene film substrate and has heat sealability.

Effect of the Invention

According to the present invention, irradiation of an electron beam to a polyethylene film can occur curing or crosslinking of polyethylene near the film surface irradiated with the electron beam. As a result, this can provide a single-layer polyethylene film in which the crosslink densities of polyethylene on the front and back sides are different. Since the polyethylene film surface irradiated with an electron beam and thereby having a higher crosslink density than that of usual polyethylene has improved heat resistance and strength, the surface can satisfy the physical properties required as the outer layer of package. On the other hand, since the other surface to which the electron beam is not irradiated has the same physical properties as those of the conventional polyethylene film, the surface can maintain the sealant property and flexibility required as the inner layer of package. Therefore, by using such a polyethylene film, a package can be manufactured using only a single-layer polyethylene film instead of a lamination film used for a package.

In addition, according to the present invention, irradiation of an electron beam to a polyethylene film substrate constituting a laminate can occur curing or crosslinking of polyethylene in the film substrate irradiated with the electron beam. Since the surface of the polyethylene film substrate irradiated with an electron beam and thereby having a higher crosslink density than that of usual polyethylene has improved heat resistance and strength, the surface can satisfy the physical properties required as the outer layer of package. Further, since the laminate according to the present invention comprises a polyethylene film layer that is not irradiated with an electron beam on at least its one side, or maintaining heat-sealability and flexibility, it can be used to prepare a package.

DETAILED DESCRIPTION OF THE INVENTION

Polyethylene Film

Figure 1:
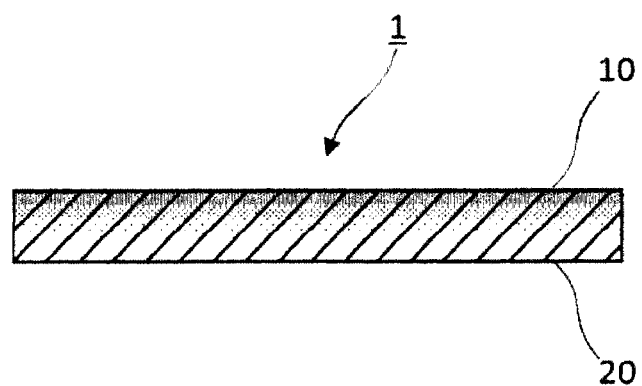
FIG. 1 is a schematic cross-sectional view of a polyethylene film of the present invention

The polyethylene film according to the present invention will be described with reference to the drawings. FIG. 1 is a schematic cross-sectional view of a polyethylene film according to one embodiment of the present invention.

The polyethylene film 1 is irradiated with an electron beam on its only one side 10, and the crosslink density of the polyethylene is different between the side 10 irradiated with an electron beam and the other side 20 not irradiated with an electron beam.

The reason why the crosslink density of polyethylene varies depending on the presence or absence of an electron irradiation is not clear but is considered as follows. When polyethylene is irradiated with an electron beam, carbon-hydrogen bonds in the polyethylene near the irradiated film surface are cleaved, and radicals are generated at the ends of the cleaved bonds. The generated radical is considered to be brought into contact with other polyethylene molecular chain due to the molecular motion of the molecular chain and extract a hydrogen atom to bond with a carbon atom in the polyethylene molecular chain, thereby forming a crosslinked structure.

In general, polyethylene films tend to contract when heated, and as the crosslink density increases, the dimensional stability tends to be improved. Therefore, polyethylene films having different crosslink densities on the front and back sides are curled like a bimetal when heated. Therefore, as a simple method for confirming that crosslink densities are different between the front and back sides of the polyethylene film, it can be confirmed by heating the obtained polyethylene film.

The crosslink density can also be determined by a method utilizing the fact that the crosslinking moiety does not dissolve in the solvent, comprising immersing the polyethylene film in an organic solvent such as methyl ethyl ketone, drying the insoluble film remaining without being dissolved, measuring the mass and calculating the gel fraction from the masses of the polyethylene film before dissolution and the insoluble film after drying. Specifically, X g of a polyethylene film is first wrapped with Y g of a stainless steel wire mesh, heated and dipped in a solvent to obtain the polyethylene film wrapped with the stainless steel wire mesh. Next, after vacuum-drying, the mass (Z g) of the polyethylene film wrapped with the stainless steel wire mesh after drying is measured. Gel fraction can be determined from the following formula (1):

$$\text{Gel fraction (\% by mass)} = (Z-Y)/X \times 100 \quad (1)$$

The gel fraction of the polyethylene film is preferably 20 to 80%, more preferably 30 to 80%, still more preferably 40 to 80%.

The polyethylene film according to the present invention comprises polyethylene. Examples of the polyethylene that can be used include those obtained by mixing one or two or more kinds of polyethylenes having different density and branching, such as high-density polyethylene (HDPE), medium-density polyethylene (MDPE), low-density polyethylene (LDPE), and linear low-density polyethylene (LLDPE). In general, high-density polyethylene refers to polyethylene having a density of 0.940 g/cm$^3$ or more, medium-density polyethylene refers to polyethylene having a density of 0.925 to 0.940 g/cm$^3$, and low-density polyethylene refers to polyethylene having a density of less than 0.925 g/cm$^3$.

In one embodiment, the polyethylene film of the present invention comprises a low-density polyethylene having a density of 0.91 g/cm$^3$ or less.

This makes it possible to realize a higher crosslink density and improve the heat resistance of the polyethylene film. The polyethylene film comprises a low-density polyethylene having a density more preferably of 0.91 g/cm$^3$ or less and 0.89 g/cm$^3$ or more, still more preferably of 0.91 g/cm$^3$ or less and 0.895 g/cm$^3$ or more.

The above-mentioned low-density polyethylene may be a linear chain or a branched chain, but preferably is a linear chain since it can realize a higher crosslink density.

The content of polyethylene having a density of 0.91 g/cm$^3$ or less in the polyethylene film is preferably 10% by mass or more and 100% by mass or less, and more preferably 20% by mass or more and 70% by mass or less.

Polyethylenes having different densities and branchings as described above can be obtained by appropriately selecting a polymerization method. For example, the polymerization method is preferably carried out in one stage or in multiple stages of two or more stages, by either one of gas phase polymerization, slurry polymerization, solution polymerization, and high-pressure ion polymerization, using a multi-site catalyst such as a Ziegler-Natta catalyst or a single-site catalyst such as a metallocene catalyst as a polymerization catalyst.

The above-mentioned single-site catalyst refers to a catalyst capable of forming a uniform active species, and is usually adjusted by bringing a metallocene-type or nonmetallocene-type transition metal compound into contact with an activating promoter. Since the single-site catalyst has a uniform active site structure as compared with that of multi-site catalyst, a polymer having a structure with high molecular weight and high homogeneity can be preferably polymerized. A single-site catalyst which is particularly preferably used is a metallocene catalyst. The metallocene catalyst is a catalyst containing each of catalyst components comprising: a transition-metal compound of Group IV of the periodic table containing a ligand having a cyclopentadienyl skeleton; a promoter; an organometallic compound, if necessary; and a carrier.

In the above-mentioned transition-metal compound of Group IV of the periodic table containing a ligand having a cyclopentadienyl skeleton, the cyclopentadienyl skeleton is, for example, a cyclopentadienyl group or a substituted cyclopentadienyl group. Examples of the substituted cyclopentadienyl group include those having at least one substituent selected from $C_1$-$C_{30}$ hydrocarbon, silyl, silyl-substituted alkyl, silyl-substituted aryl, cyano, cyanoalkyl, cyanoaryl, halogen, haloalkyl, and halosilyl. The substituted cyclopentadienyl group may have two or more substituents, and the substituents may together form a ring, such as an indenyl ring, a fluorenyl ring, an azulenyl ring, or a hydrogenated product thereof. The rings formed by bonding of the substituents may each further have a substituent.

For the transition-metal compound of Group IV of the periodic table containing a ligand having a cyclopentadienyl skeleton, examples of the transition metal include zirconium, titanium and hafnium, and among them, zirconium and hafnium are preferred. The transition metal compound usually has two ligands having a cyclopentadienyl skeleton and each of the ligands having cyclopentadienyl skeleton are preferably bound to each other by a crosslinking group. Examples of the crosslinking group include $C_1$-$C_4$ alkylene; silylene; substituted silylene such as dialkylsilylene and diarylsilylene; and substituted germylene such as dialkylgermylene and diaryl germylene. Among them, substituted silylene is preferred. For the above-mentioned transition-metal compound of Group IV of the periodic table containing a ligand having a cyclopentadienyl skeleton, the catalyst component may be a single or a mixture of two or more of them.

The promoter refers to those which can make the transition-metal compound of Group IV of the periodic table effective as a polymerization catalyst or can equalize an ionic charge in a catalytically activated state. Examples of the promoter include benzene-soluble aluminoxane of organoaluminum oxy-compound or benzene-insoluble organoaluminum oxy-compound; ion-exchangeable layered silicate; boron compounds; ionic compounds composed of a cation containing or not containing an active hydrogen group and a noncoordinating anion; lanthanoid salts such as lanthanum oxide; tin oxide; and phenoxy compounds containing a fluoro group.

The transition-metal compound of Group IV of the periodic table containing a ligand having a cyclopentadienyl skeleton may be used by supporting it on a carrier which is an inorganic or organic compound. As the carrier, porous oxides of inorganic or organic compounds are preferable, and specific examples thereof include an ion-exchangeable layered silicate such as montmorillonite, $SiO_2$, $Al_2O_3$, MgO, $ZrO_2$, $TiO_2$, $B_2O_3$, CaO, ZnO, BaO, $ThO_2$ or a mixture thereof. Examples of the organometallic compound used as necessary include organoaluminum compound, organomagnesium compound, and organozinc compound. Among them, organoaluminum is preferably used.

Copolymers of ethylene and other monomers may also be used. Examples of the ethylene copolymer include copolymers comprising ethylene and a $C_3$-$C_{20}$ α-olefin. Examples of the $C_3$-$C_{20}$ α-olefin include propylene, 1-butene, 1-pentene, 1-hexene, 1-octene, 1-decene, 1-dodecene, 1-tetradecene, 1-hexadecene, 1-octadecene, 1-eicosene, 3-methyl-1-butene, 4-methyl-1-pentene, and 6-methyl-1-heptene. A copolymer with vinyl acetate or an acrylate ester may be used as long as it does not impair the object of the present invention.

In the present invention, polyethylene obtained by using as a raw material a biomass-derived ethylene in place of a fossil fuel-derived ethylene may be used. Since such a biomass-derived polyethylene is a carbon-neutral material, a more environmentally-friendly package can be obtained. Such a biomass-derived polyethylene can be produced by the method described in, for example, Japanese Laid-open Patent Application (Kokai) No. 2013-177531. Commercially available biomass-derived polyethylene (e.g., Green PE commercially available from Braskem) may be used.

In one embodiment, the polyethylene film of the present invention comprises a crosslinking agent. The polyethylene film comprises a crosslinking agent in addition to polyethylene, so that a higher crosslink density of polyethylene film can be realized and the heat resistance can be improved.

Examples of the crosslinking agent include styrene elastomers such as styrene-polyisoprene elastomer, styrene-polybutadiene elastomer, styrene-polyisoprene-butadiene random copolymer; ethylene-acrylate copolymers such as ethylene-methyl acrylate copolymer, ethylene-ethyl acrylate copolymer, ethylene-butyl acrylate copolymer; and ethylene-acrylic ester-glycidyl methacrylate.

The content of the crosslinking agent in the polyethylene film is preferably 1 to 49% by mass, more preferably 10 to 40% by mass, still more preferably 15 to 35% by mass. When the content of the crosslinking agent is within the above numerical range, the heat resistance and strength of the polyethylene film can be further improved.

In one embodiment, the polyethylene film of the present invention comprises a light stabilizer. The polyethylene film comprises a light stabilizer, so that degradation of the polyethylene film over time can be prevented.

Examples of the light stabilizer include antioxidants such as phenolic antioxidant, amine antioxidant, phosphate antioxidant, sulfur antioxidant, hindered amine antioxidant and hydroxylamine antioxidant; and ultraviolet absorbers such as benzotriazole ultraviolet absorber, triazine ultraviolet absorber and benzophenone ultraviolet absorber. Among them, the antioxidants are preferably used since they hardly inhibit the crosslinking reaction initiated by electron irradiation to the polyethylene film.

As the antioxidant, a primary antioxidant for capturing generated radicals and a secondary antioxidant for decomposing hydroperoxide generated from radicals are preferably used in combination. Alternatively, an antioxidant having both functions of a primary antioxidant and a secondary antioxidant may be used.

Examples of the primary antioxidant include phenolic antioxidant, amine antioxidant and hindered amine antioxidant; and examples of the secondary antioxidant include phosphorus antioxidant and sulfur antioxidant; and examples of the antioxidant having both functions of a primary antioxidant and a secondary antioxidant include hydroxylamine antioxidant.

Hydroxylamine antioxidant and phosphorus antioxidant are also preferred since they can prevent coloring of the polyethylene film.

The content of the light stabilizer in the polyethylene film is preferably 0.01% by mass or more and 10% by mass or less, more preferably 0.1% by mass or more and 10% by mass or less, still more preferably 0.1% by mass or more and 8% by mass or less.

When the content of the light stabilizer is within the above numerical range, crosslinking reaction of polyethylene in the polyethylene film can be satisfactorily carried out and degradation of the film over time can be prevented.

The polyethylene film may contain various plastic compounding agents, additives and the like for the purpose of improving or modifying, for example, processability, heat resistance, weather resistance, mechanical properties, dimensional stability, antioxidant properties, slip properties, mold releasability, fire retardant properties, antifungal properties, electrical properties and strength of the film, and the amount to be added can be varied depending on the purpose, from very small amount to several tens of percent. Typical additives include, for example, fillers, reinforcing agents, antistatic agents, pigments and modifier resins.

The thickness of the polyethylene film may vary depending on its use, and is usually about 5 μm to 200 μm, preferably about 5 μm to 100 μm. The film thickness can be appropriately adjusted depending on, for example, the screw rotation speed of the melt extruder and the rotation speed of the cooling roll.

The polyethylene film can be obtained by melting a resin composition comprising at least the above-mentioned polyethylene and film-forming it by a melt extrusion molding method such as inflation molding or T-die molding. The polyethylene film can be molded, for example, by feeding the resin composition to a melt extruder heated to a temperature equal to or higher than the melting point (Tm) of the polyethylene to a temperature of Tm+120° C. to melt it and extruding it in a cylindrical shape from a die such as a circular die, and then sending air to the extruded cylindrical object to form a bubble and pressurizing it with a roller.

The polyethylene film according to the present invention is characterized in that an electron beam is irradiated on its only one surface side. It is preferable to appropriately select the irradiation energy of the electron beam depending on the use of the intended package. Usually, the higher the irradiation energy of the electron beam is, the larger the amount of radical generated, and the easier the formation of a crosslinked structure. However, if the irradiation energy is too high, molecular chains in the polyethylene are excessively cut, and the film physical properties such as strength tend to be deteriorated.

The dose of the electron beam is preferably in the range of 10 to 2000 kGy, more preferably 20 to 1000 kGy, and the accelerating voltage of the electron beam is preferably in the range of 30 to 300 kV, more preferably 50 to 300 kV, and especially preferably 50 to 250 kV. The irradiation energy of the electron beam is preferably 20 to 750 keV, more preferably 25 to 400 keV, still more preferably 30 to 300 keV, and especially preferably 20 to 200 keV.

The electron beam irradiation device used may be any conventionally known ones, and for example, a curtain type electron irradiation device (LB 1023, produced by Eye Electron Beam Co., Ltd.) or a line-irradiation type low-energy electron irradiation device (EB-ENGINE, produced by Hamamatsu Photonics Co., Ltd.) may be suitably used. In particular, a line irradiation type low-energy electron beam irradiation apparatus (EB-ENGINE, produced by Hamamatsu Photonics Co., Ltd.) may be suitably used.

The oxygen concentration in the electron irradiation device is preferably 500 ppm or less, more preferably 100 ppm or less. By performing electron beam irradiation under such conditions, generation of ozone can be suppressed, and radicals generated by electron beam irradiation can be prevented from being deactivated by oxygen in the atmosphere. Such conditions can be achieved, for example, by setting the inside of the device to an inert gas (e.g., nitrogen or argon) atmosphere.

Since the polyethylene film tends to cause thermal shrinkage, it is preferable to irradiate the electron beam simultaneously with cooling using a cooling drum or the like.

Polyethylene-Laminated Film

Figure 2:
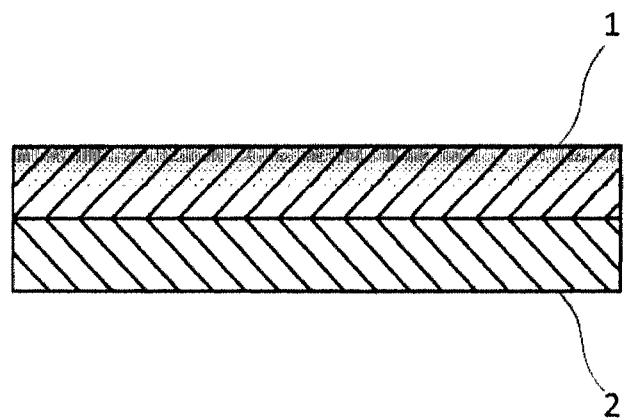
FIG. 2 is a schematic cross-sectional view of a polyethylene-laminated film according to one embodiment of the present invention.

As shown in FIG. 2, the polyethylene-laminated film according to the present invention comprises the above-mentioned polyethylene film 1 irradiated with an electron beam on its one side, and a polyethylene film 2 not irradiated with an electron beam on its both sides on the side of surface 20 not irradiated with an electron beam of the polyethylene film 1.

For the polyethylene film 1 irradiated with the above-mentioned electron beam, since the electron beam passes through the film, there may be crosslinking between molecular chains in the polyethylene even on the side not irradiated with the electron beam, so that the heat sealability on the side not irradiated with the electron beam may be inferior to that of a normal polyethylene film.

By such a configuration, a polyethylene-laminated film having different physical properties (e.g., strength and heat resistance) on the front and back sides can be obtained while using the same material (polyethylene). As the polyethylene film not irradiated with an electron beam on its both sides, a film which comprises the above-mentioned polyethylene and which is not irradiated with an electron beam can be used. Therefore, even when the polyethylene-laminated film is used, since the same polyethylene is used, recycling can be easily performed.

The above-mentioned polyethylene-laminated film can also be produced by laminating the two polyethylene films 1 and 2 by a dry lamination method using an adhesive or the like. In this case, irradiation of an electron beam may be carried out before or after the lamination.

In order to omit the processes of adhesive application and lamination, a first resin composition comprising polyethylene, a crosslinking agent and the like and a second resin composition having different composition from the first resin composition are coextruded from an inflation film molding machine or the like to prepare a lamination film. Next, irradiation of an electron beam on one side of the lamination film can also provide a polyethylene-laminated film.

In addition, a melted resin composition is extrusion-coated on the polyethylene film 1 which has been irradiated with an electron beam on its one side, so that a polyethylene-laminated film can be produced simultaneously with film-formation of the polyethylene film 2. In this case, the electron irradiation may be carried out after the film-formation of the polyethylene film 2.

The polyethylene-laminated film can also be produced by combining the above-mentioned methods. That is, a first resin composition comprising polyethylene, a crosslinking agent and the like and a second resin composition having different composition from the first resin composition are coextruded from an inflation film molding machine or the like to prepare a lamination film. Next, after irradiation with an electron beam on one side of the lamination film to obtain a lamination film, a polyethylene film not irradiated with an electron beam is laminated on the layer not irradiated with an electron beam, so that a polyethylene-laminated film can be produced.

Figure 3:
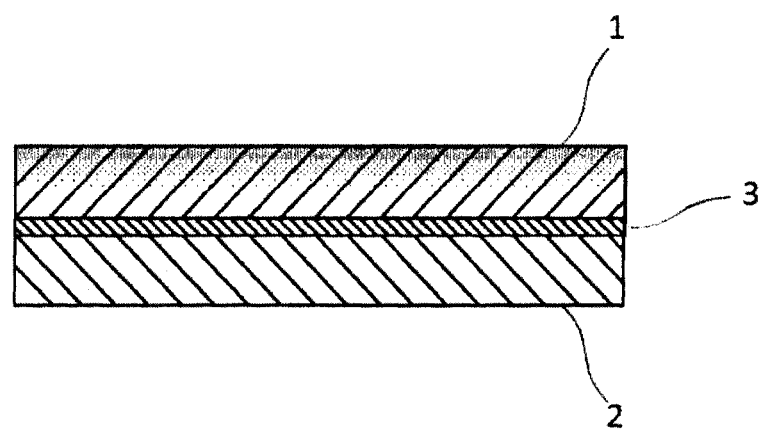
FIG. 3 is a schematic cross-sectional view of a polyethylene-laminated film according to one embodiment of the present invention.

As shown in FIG. 3, the polyethylene-laminated film according to the present invention may also comprise a barrier film 3 between the polyethylene films 1 and 2. The barrier film can be formed by vapor-depositing a metallic foil such as aluminum foil, a metal such as aluminum, or an inorganic oxide such as aluminum oxide or silicon oxide on the surface of the polyethylene film 2. As the vapor-depositing method, any known conventional methods can be used, including Physical Vapor Depositions (PVD) such as vacuum vapor deposition, sputtering, and ion plating, as well as Chemical Vapor Depositions (CVD) such as plasma-enhanced chemical vapor deposition, thermal chemical vapor deposition, and photochemical vapor deposition. When producing a film comprising a transparent laminate used for a packaging material, a vacuum vapor deposition method is mainly used and a plasma-enhanced chemical vapor deposition method is also used in some cases.

Further, a composite film comprising two or more vapor-deposited film layers of different kinds of inorganic oxides formed by using both physical vapor deposition method and the chemical vapor deposition method, for example, can be used. The degree of vacuum in the vapor deposition chamber is preferably about $10^{-2}$ to $10^{-8}$ mbar, particularly about $10^{-3}$ to $10^{-7}$ mbar before introduction of oxygen, and preferably about $10^{-1}$ to $10^{-6}$ mbar, particularly about $10^{-2}$ to $10^{-5}$ mbar after introduction of oxygen. The amount of oxygen to be introduced and the like vary depending on, for example, the size of the vapor deposition machine. As a carrier gas for the oxygen to be introduced, inert gas such as argon, helium or nitrogen gas may be used within a range that does not hinder. The film transport speed is preferably about 10 to 800 m/min, particularly about 50 to 600 m/min.

In the present invention, oxygen plasma treatment may be applied to the surface of the vapor-deposited film formed as described above. The amount of oxygen to be introduced for the oxygen plasma treatment varies depending on, for example, the size of the vapor deposition machine, and is usually about 50 sccm to 2000 sccm, particularly preferably about 300 sccm to 800 sccm. Here, sccm means the average amount (cc) of oxygen introduced per minute at the standard temperature and pressure (STP: 0° C., 1 atm). As a carrier gas for the oxygen to be introduced, inert gas such as argon, helium or nitrogen gas may be used within a range that does not hinder. Such treatment on the vapor-deposited film (barrier film) improves the adhesion when the polyethylene film 1 is laminated to the barrier film 3 formed on the polyethylene film 2. These are only examples, and the present invention is not limited to those obtained by these methods.

In one embodiment, where a polyethylene-laminated film comprising the barrier film 3 is produced, the barrier film 3 is formed on the face 20 side not irradiated with an electron beam of polyethylene film 1 as described above, and then a melted polyethylene is extrusion-coated on the barrier film, so that a lamination film can be produced simultaneously with film-formation of the polyethylene film 2.

The polyethylene film layer of the present invention may comprise a shape stabilizing layer containing a high-density polyethylene between both of the polyethylene film 1 and 2 (not shown).

By providing the shape stabilizing layer, it is possible to prevent the polyethylene-laminated film from melting and thinning due to heat sealing at the time of producing a package.

The thickness of the shape stabilizing layer may vary depending on its use, and is usually about 5 μm or more to 100 μm or less, preferably about 10 μm or more to 80 μm or less, still more preferably about 10 μm or more to 60 μm or less.

Laminate

Figure 4:
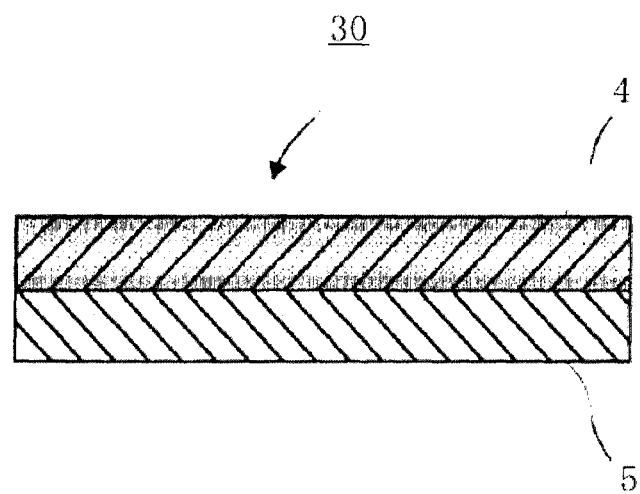
FIG. 4 is a schematic cross-sectional view of a laminate according to one embodiment of the present invention.
Figure 5:
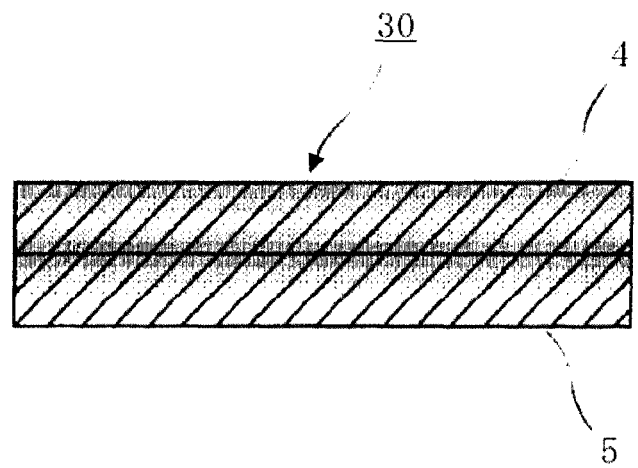
FIG. 5 is a schematic cross-sectional view of a laminate according to one embodiment of the present invention.

The laminate according to the present invention will be described with reference to the drawings. FIGS. 4 and 5 each is a schematic cross-sectional view of a laminate 30 according to one embodiment of the present invention. The laminate 30 comprises a polyethylene film substrate 4 irradiated with an electron beam on its both sides and a polyethylene film layer 2 which is not irradiated with an electron beam on at least the side opposite to the side of the polyethylene film substrate 4 and has heat sealability.

Figure 6:
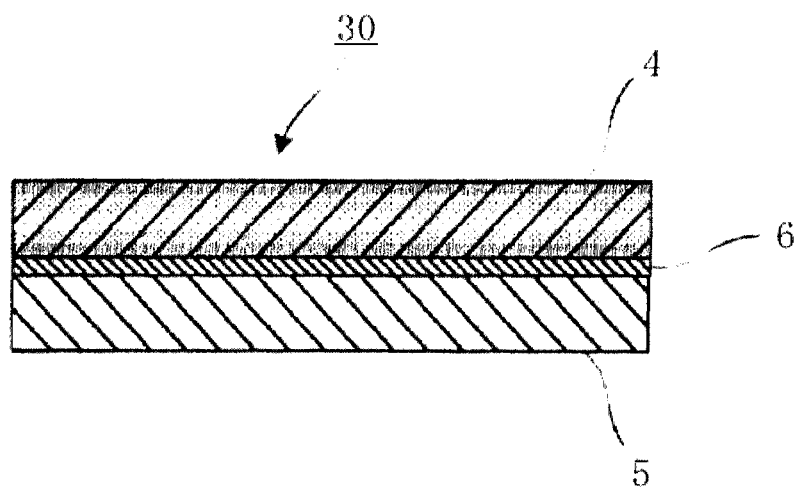
FIG. 6 is a schematic cross-sectional view of a laminate according to one embodiment of the present invention.

As shown in FIG. 6, the laminate according to one embodiment may also comprise a barrier film 6 between the polyethylene film substrate 4 and the polyethylene film layer 5.

Polyethylene Film Substrate

The polyethylene film substrate provided on the laminate according to the present invention comprises polyethylene and is irradiated with an electron beam on its both sides.

The polyethylene film substrate may be a single layer or a laminated polyethylene film substrate comprising a plurality of polyethylene films.

The laminate comprises such a polyethylene film substrate, so that the surface of the laminate can have improved heat resistance and strength, satisfying the physical properties required as the outer layer of a package or the like.

The gel fraction of the polyethylene film substrate is preferably 20 to 80%, more preferably 30 to 80%, still more preferably 40 to 80%.

Examples of the polyethylene that can be used include those obtained by mixing one or two or more kinds of polyethylenes having different density and branching, such as high-density polyethylene (HDPE), medium-density polyethylene (MDPE), low-density polyethylene (LDPE), and linear low-density polyethylene (LLDPE).

In one embodiment, the polyethylene film substrate preferably comprises a low-density polyethylene having a density of 0.91 g/cm$^3$ or less.

This makes it possible to realize a higher crosslink density and improve the heat resistance of the polyethylene film substrate. The polyethylene film substrate comprises a low-density polyethylene having a density more preferably of 0.91 g/cm$^3$ or less and 0.89 g/cm$^3$ or more, still more preferably of 0.91 g/cm$^3$ or less and 0.895 g/cm$^3$ or more.

The above-mentioned low-density polyethylene may be a linear chain or a branched chain, but preferably is a linear chain since it can realize a higher crosslink density.

The content of polyethylene having a density of 0.91 g/cm$^3$ or less in the polyethylene film substrate is preferably 10% by mass or more and 100% by mass or less, and more preferably 20% by mass or more and 70% by mass or less.

In one embodiment, the polyethylene film substrate comprises the above-mentioned crosslinking agent. The polyethylene film substrate comprises a crosslinking agent in addition to polyethylene, so that a higher crosslink density can be realized and the heat resistance can be further improved.

The content of the crosslinking agent in the polyethylene film substrate is preferably 1 to 49% by mass, more preferably 10 to 40% by mass, still more preferably 15 to 35% by mass. When the content of the crosslinking agent is within the above numerical range, the heat resistance and strength of the polyethylene film substrate can be further improved.

In one embodiment, the polyethylene film substrate comprises a light stabilizer. The polyethylene film comprises a light stabilizer, so that degradation of the laminate over time can be prevented.

As the light stabilizer, the above-mentioned light stabilizers can be used, and among them, preferably used is antioxidant.

As the antioxidant, a primary antioxidant for capturing generated radicals and a secondary antioxidant for decomposing hydroperoxide generated from radicals are preferably used in combination. Alternatively, an antioxidant having both functions of a primary antioxidant and a secondary antioxidant may be used.

Hydroxylamine antioxidant and phosphorus antioxidant are also preferred since they can prevent coloring of the polyethylene film substrate.

The content of the light stabilizer in the polyethylene film substrate is preferably 0.01% by mass or more and 10% by mass or less, more preferably 0.1% by mass or more and 10% by mass or less, still more preferably 0.1% by mass or more and 8% by mass or less.

When the content of the light stabilizer is within the above numerical range, crosslinking reaction of polyethylene in the polyethylene film substrate can be satisfactorily carried out and degradation of the film over time can be prevented.

The polyethylene film substrate may contain various plastic compounding agents, additives and the like for the purpose of improving or modifying, for example, processability, heat resistance, weather resistance, mechanical properties, dimensional stability, antioxidant properties, slip properties, mold releasability, fire retardant properties, antifungal properties, electrical properties and strength of the film, and the amount to be added can be varied depending on the purpose, from very small amount to several tens of percent. Typical additives include, for example, fillers, reinforcing agents, antistatic agents, pigments and modifier resins.

The thickness of the polyethylene film substrate may vary depending on its use, and is usually about 5 μm to 200 μm, preferably about 5 μm to 100 μm. The thickness can be appropriately adjusted depending on, for example, the screw rotation speed of the melt extruder and the rotation speed of the cooling roll.

Polyethylene Film Layer

The polyethylene film layer provided on the laminate according to the present invention comprises a polyethylene film, wherein at least the side opposite to the side of the polyethylene film substrate is not irradiated with an electron beam and has heat sealability.

The laminate comprises such a layer, so that the laminate can comprise a substrate and a layer provided on the substrate each having different physical properties (e.g., strength, heat resistance, heat sealability) while using the same material (polyethylene).

As in the polyethylene film substrate, the polyethylene film layer can comprise one or two or more kinds of polyethylenes having different density and branching such as high-density polyethylene (HDPE), medium-density polyethylene (MDPE), low-density polyethylene (LDPE), and linear low-density polyethylene (LLDPE).

Among the polyethylenes described above, low-density polyethylene and linear low-density polyethylene are preferred from the viewpoint of heat sealability.

The thickness of the polyethylene film layer may vary depending on its use, and is usually about 15 μm to 200 μm, preferably about 20 μm to 200 μm, still more preferably about 25 μm to 160 μm.

The laminate of the present invention may comprise the barrier film and/or the shape stabilizing layer described above between the polyethylene film substrate and the polyethylene film layer. The barrier film and the shape stabilizing layer may be or may not be irradiated with an electron beam.

In one embodiment, the laminate of the present invention can be produced by individually preparing a polyethylene film substrate, polyethylene film layer and the like by a melt extrusion molding method such as inflation molding or T-die molding and laminating them using a conventionally known adhesive. In this case, irradiation of an electron beam may be carried out before or after the lamination.

In other embodiments, the laminate of the present invention may be produced by melt coextrusion molding method to omit the processes of adhesive application and lamination.

A resin composition comprising polyethylene is melt on the polyethylene film substrate and extrusion-coated thereon, so that a laminate can be produced simultaneously with formation of the polyethylene film layer. In this case, irradiation of an electron beam may be carried out before or after the formation of the polyethylene film layer.

The laminate can also be produced by combining the above-mentioned methods. That is, a first resin composition comprising polyethylene, a crosslinking agent and the like and a second resin composition having different composition from the first resin composition are coextruded from an inflation film molding machine or the like to prepare a lamination film. Next, after irradiation with an electron beam on one side of the lamination film (corresponding to polyethylene film substrate), a polyethylene film not irradiated with an electron beam (polyethylene film layer) is laminated on the side not irradiated with an electron beam, so that a laminate can be produced.

The dose of the electron beam irradiated on the polyethylene film substrate is preferably in the range of 10 to 2000 kGy, more preferably 20 to 1000 kGy, and the accelerating voltage of the electron beam is preferably in the range of 30 to 300 kV, more preferably 50 to 300 kV, still more preferably 50 to 250 kV. The irradiation energy of the electron beam is preferably 20 to 750 keV, more preferably 25 to 400 keV, still more preferably 30 to 300 keV, and especially preferably 20 to 200 keV.

As the electron irradiation device, those described above can be used.

The oxygen concentration in the electron irradiation device is preferably 500 ppm or less, more preferably 100 ppm or less.

Since the polyethylene film tends to cause thermal shrinkage, it is preferable to irradiate the electron beam simultaneously with cooling using a cooling drum or the like.

Package

The package according to the present invention comprises the above-mentioned polyethylene film or laminate, wherein the face side not irradiated with an electron beam of the polyethylene film or the face side having heat sealability of a polyethylene film layer provided in the laminate is located inside.

In one embodiment, such a packaging material can be produced by folding in half and superposing the polyethylene film so that the face side not irradiated with an electron beam is inside and heat-sealing the edge.

Further, in a package according to another embodiment of the present invention, the polyethylene-laminated film described above may be used. For example, the package can be produced by folding in half and superposing the polyethylene-laminated film so that the side of the polyethylene film 2 not irradiated with an electron beam on its both sides is inside and heat-sealing the edge.

In one embodiment, such a packaging material can be produced by folding in half and superposing the laminate so that the face side having heat sealability of a polyethylene film layer provided in the laminate is inside, and heat-sealing the edge.

Various types of packages can be produced by a sealing method, for example, a side sealing type, a two-side sealing type, a three-side sealing type, a four-side sealing type, an envelope sealing type, a butt-seam sealing type (pillow sealing type), a gusset sealing type, a flat-bottom sealing type, a square-bottom sealing type, a gusset type, or other heat-sealing types. Others, for example, self-standing packaging bag (standing pouch) are also possible. The methods for heat sealing include known methods such as bar seal, rotary roll sealing, belt sealing, impulse sealing, high-frequency sealing, or ultrasonic sealing.

According to the present invention, even a film consisting of one resin material (or polyethylene) can be suitably used as a packaging film, since the polyethylene film on the side irradiated with an electron beam can satisfy the physical properties such as strength and dimensional stability required as the outer film of package while the polyethylene film on the side not irradiated with an electron beam can maintain heat sealability. In addition, since the package is produced using a film consisting of one material, recycling of the material can be easily performed after use of the package.

EXAMPLES

The present invention will be described in detail below with reference to Examples, but the present invention is not limited to the Examples.

Example 1-1

A linear low-density polyethylene (produced by Primepolymer Co., Ltd., trade name: EVOLUE SP2020) and a styrene-based elastomer (produced by Kuraray Co., Ltd., trade name: HYBRAR 7125) were dry-blended in a mass ratio of 4:1 to obtain a resin composition.

The resin composition and a linear low-density polyethylene (produced by Primepolymer Co., Ltd., trade name: EVOLUE SP2020) were coextruded in a ratio of 1:1 by inflation film molding to obtain a lamination film. The thickness of the obtained lamination film was 120 μm.

The side of the layer comprising the resin composition of the thus-obtained lamination film was irradiated with an electron beam using an electron irradiation device (line-irradiation type low-energy electron irradiation device EES-L-DP01, produced by Hamamatsu Photonics Co., Ltd.) under the following conditions to obtain a polyethylene-laminated film in which only one side of the layer comprising the resin composition was irradiated with an electron beam.

Conditions of the Electron Irradiation:
Electric potential: 70 kV
Current: 1 mA
Exposure dose: 650 kGy
Oxygen concentration in device: 100 ppm or less Example 1-2

A polyethylene-laminated film was obtained in the same manner as in Example 1, except that the exposure dose of the electron beam was changed to 430 kGy in Example 1-1.

Example 1-3

A low-density polyethylene (produced by PTT, trade name: LD2420H) and a styrene-based elastomer (produced by Kuraray Co., Ltd., trade name: HYBRAR 7311) were dry-blended in a mass ratio of 3:2 to obtain a resin composition.

The resin composition and a low-density polyethylene (produced by PTT, trade name: LD2420H) were coextruded in a ratio of 1:1 by inflation film molding to obtain a lamination film. The thickness of the obtained lamination film was 120 μm.

The side of the layer comprising the resin composition of the thus-obtained lamination film was irradiated with an electron beam using an electron irradiation device (line-irradiation type low-energy electron irradiation device EES-L-DP01, produced by Hamamatsu Photonics Co., Ltd.) under the same conditions as in Example 1-1 to obtain a polyethylene-laminated film in which only one side of the layer comprising the resin composition was irradiated with an electron beam.

Example 1-4

A polyethylene-laminated film was obtained in the same manner as in Example 1-3, except that the exposure dose of the electron beam was changed to 430 kGy.

Example 1-5

A linear low-density polyethylene (produced by Primepolymer Co., Ltd., trade name: EVOLUE SP2020) and an ethylene-methyl acrylate copolymer (produced by LOTRYL, trade name: 18MA02) were dry-blended in a mass ratio of 4:1 to obtain a resin composition.

The resin composition and a linear low-density polyethylene (produced by Primepolymer Co., Ltd., trade name: EVOLUE SP2020) were coextruded in a ratio of 1:1 by inflation film molding to obtain a lamination film. The thickness of the obtained lamination film was 120 μm.

The side of the layer comprising the resin composition of the thus-obtained lamination film was irradiated with an electron beam using an electron irradiation device (line-irradiation type low-energy electron irradiation device EES-L-DP01, produced by Hamamatsu Photonics Co., Ltd.) under the same conditions as in Example 1-1 to obtain a polyethylene-laminated film in which only one side of the layer comprising the resin composition was irradiated with an electron beam.

Example 1-6

A polyethylene-laminated film was obtained in the same manner as in Example 1-5, except that the exposure dose of the electron beam was changed to 430 kGy.

Example 1-7

A linear low-density polyethylene (produced by Primepolymer Co., Ltd., trade name: EVOLUE SP2020) and a styrene-based elastomer (produced by Kuraray Co., Ltd., trade name: HYBRAR 7125) were dry-blended in a mass ratio of 9:1 to obtain a resin composition.

The resin composition was extruded by inflation film molding to obtain a polyethylene film. The thickness of the obtained polyethylene film was 120 μm.

The one side of the thus-obtained polyethylene film was irradiated with an electron beam using an electron irradiation device (line-irradiation type low-energy electron irradiation device EES-L-DP01, produced by Hamamatsu Photonics Co., Ltd.) under the same conditions as in Example 1-1 to obtain a polyethylene film irradiated with an electron beam only on one side thereof.

Example 1-8

A polyethylene film was obtained in the same manner as in Example 7, except that the exposure dose of the electron beam was changed to 430 kGy.

Comparative Example 1-1

A linear low-density polyethylene (produced by Primepolymer Co., Ltd., trade name: EVOLUE SP2020) was subjected to inflation film molding to obtain a polyethylene film having a thickness of 120 μm.

Comparative Example 1-2

A polyethylene-laminated film was obtained in the same manner as in Example 1-1, except that electron irradiation was not carried out.

Comparative Example 1-3

The one side of the polyethylene film obtained in Comparative Example 1 was irradiated with an electron beam using an electron irradiation device (line-irradiation type low-energy electron irradiation device EES-L-DP01, produced by Hamamatsu Photonics Co., Ltd.) under the same conditions as in Example 1-1 to obtain a polyethylene film irradiated with an electron beam only on one side thereof.

Evaluation of Heat Sealability
Evaluation of Appearance

The polyethylene films and the polyethylene-laminated films obtained in the above-described Examples and Comparative Examples were cut into 10 cm×10 cm to prepare three sample pieces for each sample. The sample piece was folded in half so that the face side not irradiated with the electron beam was inside, and a 1 cm×10 cm area of this sample piece was heat-sealed using a heat-sealing tester at a temperature of 180° C. and a pressure of 1 kgf/cm² for 1 second. The remaining two sample pieces were heat-sealed in the same manner except that the temperature was changed to 190° C. and 200° C., respectively. Since both sides of the polyethylene film of Comparative Example 1 was not irradiated with an electron beam, the film was folded in half without distinction between front and back and heat-sealed. For the sample piece from Comparative Example 1-2, the sample piece was folded in half so that the layer comprising the resin composition was outside.

The obtained heat-sealed sample piece was visually evaluated for appearance.

Evaluation Criteria were as Follows:
○: the surface is not molten even when heat-sealed at 200° C. and thus the sample piece has no problem in appearance
Δ: the surface is molten when heat-sealed at 190° C. and thus the sample piece has a problem in appearance
×: the surface is molten when heat-sealed at 180° C. and thus the sample piece has a problem in appearance.

The evaluation results were as shown in Table 1 below.

Seal Strength

The heat-sealed sample piece was cut in rectangles with a width of 15 mm, and both edges not heat-sealed were grasped by a tensile tester, and the peel strength (N/15 mm) was measured under the conditions where the rate was 300 mm/min and the load range was 50 N. The measurement results were as shown in Table 1 below.

Gel Fraction

The polyethylene films and the polyethylene-laminated films obtained in the above-described Examples and Comparative Examples were cut to 1 g to prepare sample pieces. The sample pieces were wrapped with 5 g 400 mesh stainless steel mesh and immersed in 100 ml of xylene at 120° C. for 24 hours. After that, the sample piece wrapped with the stainless steel mesh was dried under vacuum at 80° C. for 16 hours, and then the mass was measured to determine the gel fraction.

TABLE 1

| Evaluation of | Seal Strength (N/15 mm) | | | Gel fraction |
|---|---|---|---|---|
| | Appearance | 180° C. | 190° C. | 200° C. | (%) |
| Example 1-1 | ○ | 24 | 25 | 25 | 40 |
| Example 1-2 | ○ | 22 | 23 | 23 | 37 |
| Example 1-3 | ○ | 17 | 18 | 18 | 55 |
| Example 1-4 | ○ | 15 | 16 | 16 | 48 |
| Example 1-5 | ○ | 20 | 22 | 23 | 50 |
| Example 1-6 | ○ | 19 | 20 | 21 | 48 |
| Example 1-7 | ○ | 17 | 18 | 20 | 42 |
| Example 1-8 | ○ | 16 | 18 | 19 | 41 |
| Comparative Example 1-1 | × | Unmeasurable due to film melting | | | 5 |
| Comparative Example 1-2 | × | Unmeasurable due to film melting | | | 5 |
| Comparative Example 1-3 | Δ | 20 | Unmeasurable due to film melting | | 15 |

Example 2-1

A linear low-density polyethylene (produced by Primepolymer Co., Ltd., trade name: EVOLUE SP2020) and a styrene-based elastomer (produced by Kuraray Co., Ltd., trade name: HYBRAR 7125) were dry-blended in a mass ratio of 4:1 to obtain a resin composition.

The resin composition and a linear low-density polyethylene (produced by Primepolymer Co., Ltd., trade name: EVOLUE SP2020) were coextruded in a ratio of 1:1 by inflation film molding to obtain a lamination film. The thickness of the obtained lamination film was 60 μm.

The side of the layer comprising the resin composition of the thus-obtained polyethylene film substrate was irradiated with an electron beam using an electron irradiation device (line-irradiation type low-energy electron irradiation device EES-L-DP01, produced by Hamamatsu Photonics Co., Ltd.) under the following conditions to obtain a lamination film in which both sides of the layer comprising the resin composition (polyethylene film substrate) were irradiated with an electron beam.

Conditions of the Electron Irradiation:
  Electric potential: 110 kV
  Current: 1 mA
  Exposure dose: 650 kGy
  Oxygen concentration in device: 100 ppm or less After the electron irradiation, a linear low-density polyethylene film having a thickness of 60 μm (produced by Toyobo Co., Ltd., trade name: LIX L6100) was dry-laminated as a polyethylene film layer on the side of the linear low-density polyethylene of the lamination film via a two-component urethane adhesive (produced by Rock Paint Co., Ltd., trade name: RU-40/curing agent H-4) to obtain a laminate.

Example 2-2

A laminate was obtained in the same manner as in Example 2-1, except that the exposure dose of the electron beam was changed to 430 kGy.

Example 2-3

A low-density polyethylene (produced by PTT, trade name: LD2420H) and a styrene-based elastomer (produced by Kuraray Co., Ltd., trade name: HYBRAR 7311) were dry-blended in a mass ratio of 3:2 to obtain a resin composition.

The resin composition and a low-density polyethylene (produced by PTT, trade name: LD2420H) were coextruded in a ratio of 1:1 by inflation film molding to obtain a lamination film. The thickness of the obtained lamination film was 60 μm.

The side of the layer comprising the resin composition of the thus-obtained lamination film (polyethylene film substrate) was irradiated with an electron beam using an electron irradiation device (line-irradiation type low-energy electron irradiation device EES-L-DP01, produced by Hamamatsu Photonics Co., Ltd.) under the same conditions as in Example 2-1 to obtain a lamination film in which both sides of at least the layer comprising the resin composition (polyethylene film substrate) were irradiated with an electron beam.

After the electron irradiation, a linear low-density polyethylene film having a thickness of 60 μm (produced by Toyobo Co., Ltd., trade name: LIX L6100) was dry-laminated as a polyethylene film layer on the side of the low-density polyethylene of the lamination film via a two-component urethane adhesive (produced by Rock Paint Co., Ltd., trade name: RU-40/curing agent H-4) to obtain a laminate.

Example 2-4

A laminate was obtained in the same manner as in Example 2-3, except that the exposure dose of the electron beam was changed to 430 kGy.

Example 2-5

A linear low-density polyethylene (produced by Primepolymer Co., Ltd., trade name: EVOLUE SP2020) and an ethylene-methyl acrylate copolymer (produced by Arkema Co., Ltd., trade name: LOTRYL18MA02) were dry-blended in a mass ratio of 4:1 to obtain a resin composition.

The resin composition and a linear low-density polyethylene (produced by Primepolymer Co., Ltd., trade name: EVOLUE SP2020) were coextruded in a ratio of 1:1 by inflation film molding to obtain a lamination film. The thickness of the obtained lamination film was 60 μm.

The side of the layer comprising the resin composition of the thus-obtained lamination film was irradiated with an electron beam using an electron irradiation device (line-irradiation type low-energy electron irradiation device EES-L-DP01, produced by Hamamatsu Photonics Co., Ltd.) under the same conditions as in Example 2-1 to obtain a lamination film in which both sides of the layer comprising the resin composition (polyethylene film substrate) were irradiated with an electron beam.

After the electron irradiation, a linear low-density polyethylene film having a thickness of 60 μm (produced by Toyobo Co., Ltd., trade name: LIX L6100) was dry-laminated as a polyethylene film layer on the side of the linear low-density polyethylene of the lamination film via a two-component urethane adhesive (produced by Rock Paint Co., Ltd., trade name: RU-40/curing agent H-4) to obtain a laminate.

Example 2-6

A laminate was obtained in the same manner as in Example 2-5, except that the exposure dose of the electron beam was changed to 430 kGy.

Example 2-7

A linear low-density polyethylene (produced by Primepolymer Co., Ltd., trade name: EVOLUE SP2020) and a styrene-based elastomer (produced by Kuraray Co., Ltd., trade name: HYBRAR 7125) were dry-blended in a mass ratio of 9:1 to obtain a resin composition.

The resin composition was extruded by inflation film molding to obtain a polyethylene film substrate. The thickness of the obtained polyethylene film substrate was 60 μm.

The one side of the thus-obtained polyethylene film substrate was irradiated with an electron beam using an electron irradiation device (line-irradiation type low-energy electron irradiation device EES-L-DP01, produced by Hamamatsu Photonics Co., Ltd.) under the same conditions as in Example 2-1 to obtain a polyethylene film irradiated with an electron beam on both sides thereof.

After the electron irradiation, a linear low-density polyethylene film having a thickness of 60 μm (produced by Toyobo Co., Ltd., trade name: LIX L6100) was dry-laminated as a polyethylene film layer on the polyethylene film substrate via a two-component urethane adhesive (produced by Rock Paint Co., Ltd., trade name: RU-40/curing agent H-4) to obtain a laminate.

Example 2-8

A laminate was obtained in the same manner as in Example 2-7, except that the exposure dose of the electron beam was changed to 430 kGy.

Comparative Example 2-1

A linear low-density polyethylene (produced by Primepolymer Co., Ltd., trade name: EVOLUE SP2020) was subjected to inflation film molding to obtain a polyethylene film substrate having a thickness of 120 μm.

A linear low-density polyethylene film having a thickness of 60 μm (produced by Toyobo Co., Ltd., trade name: LIX L6100) was dry-laminated as a polyethylene film layer on the polyethylene film substrate via a two-component urethane adhesive (produced by Rock Paint Co., Ltd., trade name: RU-40/curing agent H-4) to obtain a laminate.

Comparative Example 2-2

A laminate was obtained in the same manner as in Example 2-1, except that electron irradiation was not carried out.

Comparative Example 2-3

The one side of the polyethylene film substrate obtained in Comparative Example 2-1 was irradiated with an electron beam using an electron irradiation device (line-irradiation type low-energy electron irradiation device EES-L-DP01, produced by Hamamatsu Photonics Co., Ltd.) under the same conditions as in Example 2-1 to obtain a polyethylene film irradiated with an electron beam on both sides thereof.

After the electron irradiation, a linear low-density polyethylene film having a thickness of 60 μm (produced by Toyobo Co., Ltd., trade name: LIX L6100) was dry-laminated as a polyethylene film layer on the polyethylene film substrate via a two-component urethane adhesive (produced by Rock Paint Co., Ltd., trade name: RU-40/curing agent H-4) to obtain a laminate.

Evaluation of Heat Sealability

Evaluation of Appearance

The laminates obtained in the above-described Examples and Comparative Examples were cut into 10 cm×10 cm to prepare three sample pieces for each sample. The sample piece was folded in half so that the face side not irradiated with the electron beam, or the side of dry-laminated polyethylene film layer, was inside, and a 1 cm×10 cm area of this sample piece was heat-sealed using a heat-sealing tester at a temperature of 180° C. and a pressure of 1 kgf/cm² for 1 second. The remaining two sample pieces were heat-sealed in the same manner except that the temperature was changed to 190° C. and 200° C., respectively.

The obtained heat-sealed sample piece was visually evaluated for appearance. Evaluation criteria were as follows. The evaluation results were as shown in Table 2 below.

○: the surface is not molten even when heat-sealed at 200° C. and thus the sample piece has no problem in appearance Δ: the surface is molten when heat-sealed at 190° C. and thus the sample piece has a problem in appearance ×: the surface is molten when heat-sealed at 180° C. and thus the sample piece has a problem in appearance.

Seal Strength

The heat-sealed sample piece was cut in rectangles with a width of 15 mm, and both edges not heat-sealed were grasped by a tensile tester, and the peel strength (N/15 mm) was measured under the conditions where the rate was 300 mm/min and the load range was 50 N. The measurement results were as shown in Table 2 below.

Gel Fraction

Each of the laminates obtained in the above-described Examples and Comparative Examples was cut to 1 g to prepare a sample piece. The sample piece was wrapped with 5 g 400 mesh stainless steel mesh and immersed in 100 ml of xylene at 120° C. for 24 hours. After that, the sample piece wrapped with the stainless steel mesh was dried under vacuum at 80° C. for 16 hours, and then the mass was measured to determine the gel fraction.

TABLE 2

| | Evaluation of Appearance | Seal Strength (N/15 mm) | | | Gel fraction (%) |
|---|---|---|---|---|---|
| | | 180° C. | 190° C. | 200° C. | |
| Example 2-1 | ○ | 88 | 89 | 90 | 40 |
| Example 2-2 | ○ | 90 | 92 | 93 | 37 |
| Example 2-3 | ○ | 87 | 89 | 95 | 55 |
| Example 2-4 | ○ | 80 | 85 | 90 | 48 |
| Example 2-5 | ○ | 82 | 89 | 92 | 50 |
| Example 2-6 | ○ | 83 | 87 | 91 | 48 |
| Example 2-7 | ○ | 84 | 85 | 90 | 43 |
| Example 2-8 | ○ | 86 | 88 | 93 | 39 |
| Comparative Example 2-1 | × | Unmeasurable due to film melting | | | 5 |
| Comparative Example 2-2 | × | Unmeasurable due to film melting | | | 5 |
| Comparative Example 2-3 | Δ | 20 | Unmeasurable due to film melting | | 15 |

Example 3-1

A linear low-density polyethylene (density: 0.903 g/cm³, produced by Primepolymer Co., Ltd., trade name: SP0511) was extruded by inflation film molding to obtain a polyethylene film having a thickness of 60 μm.

The one side of the thus-obtained polyethylene film was irradiated with an electron beam using a line-irradiation type electron irradiation device (produced by Hamamatsu Photonics Co., Ltd., trade name: EB-ENGINE) under the following conditions to obtain a polyethylene film irradiated with an electron beam only on one side thereof.

Electric potential: 70 kV
Current: 1 mA
Exposure dose: 650 kGy
Oxygen concentration in device: 100 ppm or less Example 3-2

A polyethylene film was obtained in the same manner as in Example 3-1, except that the exposure dose of the electron beam was changed to 430 kGy.

Example 3-3

A polyethylene film was obtained in the same manner as in Example 3-1, except that the linear low-density polyethylene (density: 0.903 g/cm³, produced by Primepolymer Co., Ltd., trade name: SP0511) used in the preparation of the electron-irradiated polyethylene film was changed to a linear low-density polyethylene (density: 0.890 g/cm³, produced by Primepolymer Co., Ltd., trade name: SP9044).

Example 3-4

A polyethylene film was obtained in the same manner as in Example 3-3, except that the exposure dose of the electron beam was changed to 430 kGy.

Comparative Example 3-1

A linear low-density polyethylene (density: 0.903 g/cm³, produced by Primepolymer Co., Ltd., trade name: SP0511) was extruded by inflation film molding to obtain a polyethylene film having a thickness of 60 μm.

Comparative Example 3-2

A polyethylene film was obtained in the same manner as in Example 3-1, except that the linear low-density polyethylene (density: 0.903 g/cm³, produced by Primepolymer Co., Ltd., trade name: SP0511) used in the preparation of the electron-irradiated polyethylene film was changed to a linear low-density polyethylene (density: 0.924 g/cm³, produced by Ube-Maruzen Polyethlene, trade name: 125FN).

Comparative Example 3-3

A polyethylene film was obtained in the same manner as in Comparative Example 3-2, except that the exposure dose of the electron beam was changed to 430 kGy.
Evaluation of Heat Sealability
Evaluation of Appearance The polyethylene films obtained in the above-described Examples and Comparative Examples were cut into 10 cm×10 cm to prepare three sample pieces for each sample. The sample piece was folded in half so that the face side not irradiated with the electron beam was inside, and a 1 cm×10 cm area of this sample piece was heat-sealed using a heat-sealing tester at a temperature of 180° C. and a pressure of 1 kgf/cm² for 1 second. The remaining two sample pieces were heat-sealed in the same manner except that the temperature was changed to 190° C. and 200° C., respectively. Since both sides of the polyethylene film of Comparative Example 3-1 was not irradiated with an electron beam, the film was folded in half without distinction between front and back and heat-sealed.

The obtained heat-sealed sample piece was visually evaluated for appearance.

Evaluation criteria were as follows.

The evaluation results were as shown in Table 3 below.
  ⊚: the surface is not molten even when heat-sealed at 200° C. and thus the sample piece has no problem in appearance
  ○: the surface is molten when heat-sealed at 200° C. and thus the sample piece has a problem in appearance
  Δ: the surface is molten when heat-sealed at 190° C. and thus the sample piece has a problem in appearance
  ×: the surface is molten when heat-sealed at 180° C. and thus the sample piece has a problem in appearance.

Seal Strength

The heat-sealed sample piece was cut in rectangles with a width of 15 mm, and both edges not heat-sealed were grasped by a tensile tester, and the peel strength (N/15 mm) was measured under the conditions where the rate was 300 mm/min and the load range was 50 N. The measurement results were as shown in Table 3 below.

Gel Fraction

The polyethylene films obtained in the Examples and Comparative Examples were cut to 1 g to prepare sample pieces. The sample piece was wrapped with 5 g 400 mesh stainless steel mesh and immersed in 100 ml of xylene at 120° C. for 24 hours. After that, the sample piece wrapped with the stainless steel mesh was dried under vacuum at 80° C. for 16 hours, and then the mass was measured to determine the gel fraction.

TABLE 3

| | Evaluation of Appearance | Seal Strength (N/15 mm) | | | Gel fraction (%) |
|---|---|---|---|---|---|
| | | 180° C. | 190° C. | 200° C. | |
| Example 3-1 | ⊚ | 42 | 46 | 50 | 55 |
| Example 3-2 | ⊚ | 44 | 45 | 49 | 48 |
| Example 3-3 | ⊚ | 44 | 48 | 50 | 50 |
| Example 3-4 | ⊚ | 41 | 44 | 47 | 48 |
| Comparative Example 3-1 | × | Unmeasurable due to film melting | | | 5 |
| Comparative Example 3-2 | ○ | 42 | 46 | Unmeasurable due to film melting | 20 |
| Comparative Example 3-3 | ○ | 44 | 47 | Unmeasurable due to film melting | 25 |

Example 4-1

A linear low-density polyethylene (density: 0.903 g/cm³, produced by Primepolymer Co., Ltd., trade name: SP0511) was extruded by inflation film molding to obtain a polyethylene film substrate having a thickness of 60 μm.

The one side of the thus-obtained polyethylene film substrate was irradiated with an electron beam using an electron irradiation device (line-irradiation type low-energy electron irradiation device EES-L-DP01, produced by Hamamatsu Photonics Co., Ltd.) under the following conditions to obtain a polyethylene film totally-irradiated with an electron beam.
  Electric potential: 110 kV
  Current: 1 mA
  Exposure dose: 650 kGy
  Oxygen concentration in device: 100 ppm or less A linear low-density polyethylene film (produced by Toyobo Co., Ltd., trade name: LIX L6100) was dry-laminated as a polyethylene film layer on the above-described polyethylene film substrate via a two-component urethane adhesive (produced by Rock Paint Co., Ltd., trade name: RU-40, curing agent H-4) to obtain a laminate.

Example 4-2

A laminate was obtained in the same manner as in Example 4-1, except that the exposure dose of the electron beam was changed to 430 kGy.

Example 4-3

A laminate was obtained in the same manner as in Example 4-1, except that the linear low-density polyethylene (density: 0.903 g/cm³, produced by Primepolymer Co., Ltd., trade name: SP0511) used in the preparation of the polyethylene film substrate was changed to a linear low-density polyethylene (density: 0.890 g/cm³, produced by Primepolymer Co., Ltd., trade name: SP9044).

Example 4-4

A laminate was obtained in the same manner as in Example 4-3, except that the exposure dose of the electron beam was changed to 430 kGy.

Comparative Example 4-1

A linear low-density polyethylene (density: 0.903 g/cm³, produced by Primepolymer Co., Ltd., trade name: SP0511)

was extruded by inflation film molding to obtain a polyethylene film substrate having a thickness of 60 μm.

A linear low-density polyethylene film (produced by Toyobo Co., Ltd., trade name: LIX L6100) was dry-laminated as a polyethylene film layer on one side of the above-described polyethylene film substrate via a two-component urethane adhesive (produced by Rock Paint Co., Ltd., trade name: RU-40, curing agent H-4) to obtain a laminate.

Comparative Example 4-2

A laminate was obtained in the same manner as in Example 4-1, except that the linear low-density polyethylene (density: 0.903 g/cm³, produced by Primepolymer Co., Ltd., trade name: SP0511) used in the preparation of the polyethylene film substrate was changed to a linear low-density polyethylene (density: 0.924 g/cm³, produced by Ube-Maruzen Polyethlene, trade name: 125FN).

Comparative Example 4-3

A laminate was obtained in the same manner as in Comparative Example 4-2, except that the exposure dose of the electron beam was changed to 430 kGy.
Evaluation of Heat Sealability
Evaluation of Appearance The laminates obtained in the above-described Examples and Comparative Examples were cut into 10 cm×10 cm to prepare three sample pieces for each sample. The sample piece was folded in half so that the side of polyethylene film layer was inside, and a 1 cm×10 cm area of this sample piece was heat-sealed using a heat-sealing tester at a temperature of 180° C. and a pressure of 1 kgf/cm² for 1 second. The remaining two sample pieces were heat-sealed in the same manner except that the temperature was changed to 190° C. and 200° C., respectively.

The obtained heat-sealed sample piece was visually evaluated for appearance. Evaluation criteria were as follows. The evaluation results were as shown in Table 4 below.
  ◎: the surface is not molten even when heat-sealed at 200° C. and thus the sample piece has no problem in appearance
  ○: the surface is molten when heat-sealed at 200° C. and thus the sample piece has a problem in appearance
  Δ: the surface is molten when heat-sealed at 190° C. and thus the sample piece has a problem in appearance
  ×: the surface is molten when heat-sealed at 180° C. and thus the sample piece has a problem in appearance.
Seal Strength The heat-sealed sample piece was cut in rectangles with a width of 15 mm, and both edges not heat-sealed were grasped by a tensile tester, and the peel strength (N/15 mm) was measured under the conditions where the rate was 300 mm/min and the load range was 50 N. The measurement results were as shown in Table 4 below.
Gel Fraction The laminates obtained in the above-described Examples and Comparative Examples were cut to 1 g to prepare sample pieces. The sample piece was wrapped with 5 g 400 mesh stainless steel mesh and immersed in 100 ml of xylene at 120° C. for 24 hours. After that, the sample piece wrapped with the stainless steel mesh was dried under vacuum at 80° C. for 16 hours, and then the mass was measured to determine the gel fraction.

TABLE 4

| | Evaluation of Appearance | Seal Strength (N/15 mm) | | | Gel fraction (%) |
|---|---|---|---|---|---|
| | | 180° C. | 190° C. | 200° C. | |
| Example 4-1 | ◎ | 87 | 90 | 97 | 55 |
| Example 4-2 | ◎ | 84 | 93 | 96 | 48 |
| Example 4-3 | ◎ | 95 | 97 | 95 | 50 |
| Example 4-4 | ◎ | 89 | 95 | 95 | 48 |
| Comparative Example 4-1 | × | Unmeasurable due to film melting | | | 5 |
| Comparative Example 4-2 | ○ | 83 | 65 | Unmeasurable due to film melting | 20 |
| Comparative Example 4-3 | ○ | 88 | 70 | Unmeasurable due to film melting | 25 |

Example 5-1

To a linear low-density polyethylene (density: 0.904 g/cm², MFR: 1.0, produced by Dow Chemical Japan Co., Ltd., trade name: AFFINITY 1881G), a phenolic antioxidant (produced by BASF Co., Ltd., trade name: Irganox 1010/FF) and a phosphorus antioxidant (produced by BASF Co., Ltd., trade name: Irgafos 168/FF) were added in a mass ratio of 1:1 so as to be 5% by mass based on the total mass of a resin composition to be obtained to obtain a resin composition.

The thus-obtained resin composition, a high-density polyethylene (resin composition for shape stabilizing layer, density: 0.959 g/cm², MFR: 1.0, produced by Primepolymer Co., Ltd., trade name: HZ3600F), and a linear low-density polyethylene (resin composition for polyethylene film layer, density: 0.916 g/cm², MFR: 2.3, produced by Primepolymer Co., Ltd., trade name: SP2020) were coextruded in a ratio of 1:3:1 by inflation film molding to obtain a lamination film. The thickness of the obtained lamination film was 100 μm.

The side of the layer comprising the resin composition of the thus-obtained lamination film (polyethylene film substrate) was irradiated with an electron beam using an electron irradiation device (line-irradiation type irradiation device EZ-CURE, produced by Iwasaki Electric Co., Ltd.) under the following conditions to obtain a laminate in which both sides of the layer comprising the resin composition (polyethylene film substrate) were irradiated with an electron beam and the layer comprising the linear low-density polyethylene (polyethylene film layer) had heat sealability.
Conditions of the Electron Irradiation:
  Electric potential: 110 kV
  Exposure dose: 200 kGy
  Oxygen concentration in device: 100 ppm or less
  Line rate: 25 m/min Example 5-2

A laminate was obtained in the same manner as in Example 5-1, except that the phenolic antioxidant and the phosphorus processing antioxidant in the resin composition were changed to a hydroxylamine antioxidant.

Example 5-3

A laminate was obtained in the same manner as in Example 5-1, except that the resin composition was obtained by adding the phenolic antioxidant so as to be 5% by mass based on the total mass of the resin composition.

Comparative Example 5-1

A laminate was obtained in the same manner as in Example 5-1, except that the phenolic antioxidant and the phosphorus processing stabilizer in the resin composition were not added.

Comparative Example 5-2

A laminate was obtained in the same manner as in Example 5-1, except that electron irradiation was not carried out.
Evaluation of Heat Sealability
Seal Strength (Immediately after Manufacture)

The laminates immediately after obtained in the above-described Examples and Comparative Examples were cut into 10 cm×10 cm to prepare three sample pieces for each sample. The sample piece was folded in half so that the face side not irradiated with the electron beam, or the side of the layer comprising the linear low-density polyethylene (polyethylene film layer), was inside, and a 1 cm×10 cm area of this sample piece was heat-sealed using a heat-sealing tester at a temperature of 140° C. and a pressure of 1 kgf/cm² for 1 second.

The heat-sealed sample piece was cut in rectangles with a width of 15 mm, and both edges not heat-sealed were grasped by a tensile tester, and the peel strength (N/15 mm) was measured under the conditions where the rate was 300 mm/min and the load range was 50 N. The measurement results were as shown in Table 5 below.

The laminate obtained in Comparative Example 5-2 was melt in heat sealing and thus could not be measured for the seal strength.
Seal Strength (after 6 Months)

The laminates obtained in the above-described Examples and Comparative Examples were stored at a temperature of 40° C. and a relative humidity of 75% for 6 months before cutting it into 10 cm×10 cm to prepare three sample pieces for each sample. The sample piece was folded in half so that the face side not irradiated with the electron beam, or the side of the layer comprising the linear low-density polyethylene (polyethylene film layer), was inside, and a 1 cm×10 cm area of this sample piece was heat-sealed using a heat-sealing tester at a temperature of 180° C. and a pressure of 1 kgf/cm² for 1 second.

The heat-sealed sample piece was cut in rectangles with a width of 15 mm, and both edges not heat-sealed were grasped by a tensile tester, and the peel strength (N/15 mm) was measured under the conditions where the rate was 300 mm/min and the load range was 50 N. The measurement results were as shown in Table 5 below.

The laminate obtained in Comparative Example 2 was melt in heat sealing and thus could not be measured for the seal strength.
Gel Fraction The laminates obtained in the above-described Examples and Comparative Examples were cut to 1 g to prepare sample pieces. The sample piece was wrapped with 5 g 400 mesh stainless steel mesh and immersed in 100 ml of xylene at 120° C. for 24 hours. After that, the sample piece wrapped with the stainless steel mesh was dried under vacuum at 80° C. for 16 hours, and then the mass was measured to determine the gel fraction. The measurement results were as shown in Table 5 below.
Color Difference Each of the laminates obtained in the above-described Examples and Comparative Examples was stacked by five, and L*, a* and b* were determined using a spectrophotometer (produced by AS ONE Corporation, trade name: Sefi). The measurement results were as shown in Table 5 below.

TABLE 5

| Table 5 | Seal Strength (N/15 mm) | | | | | | Gel fraction (%) | Color difference | | |
|---|---|---|---|---|---|---|---|---|---|---|
| | Immediately after manufacture | | | | | After 6 months | | | | |
| | 140° C. | 150° C. | 160° C. | 170° C. | 180° C. | 180° C. | | L* | a* | b* |
| Example 5-1 | 30.9 | 32.1 | 31.9 | 31.1 | 31.0 | 30.3 | 22 | 92.7 | −1.09 | 2.45 |
| Example 5-2 | 31.0 | 32.2 | 32.4 | 31.9 | 31.8 | 30.8 | 30 | 92.5 | −1.12 | 2.39 |
| Example 5-3 | 30.9 | 32.1 | 32.4 | 31.9 | 31.0 | 25.5 | 24 | 92.5 | −1.12 | 4.05 |
| Comparative Example 5-1 | 31.9 | 32.3 | 32.9 | 32.1 | 31.5 | 20.1 | 25 | 90.9 | −1.80 | 3.90 |
| Comparative Example 5-2 | film melting | | | | | film melting | Unmeasurable due to film melting | 93.11 | −0.90 | 1.33 |

Example 6-1

To a linear low-density polyethylene (density: 0.904 g/cm², MFR: 1.0, produced by Dow Chemical Japan Co., Ltd., trade name: AFFINITY 1881G), a styrene-based elastomer (produced by Kuraray Co., Ltd., trade name: HYBRAR 7125) so as to be 20% by mass based on the total mass of a resin composition to be obtained, as well as a phenolic antioxidant (produced by BASF Co., Ltd., trade name: Irganox 1010/FF) and a phosphorus antioxidant (produced by BASF Co., Ltd., trade name: Irgafos 168/FF) in a mass ratio of 1:1 so as to be 5% by mass based on the total mass of a resin composition to be obtained were added to obtain a resin composition.

The thus-obtained resin composition, a high-density polyethylene (resin composition for shape stabilizing layer, density: 0.959 g/cm², MFR: 1.0, produced by Primepolymer Co., Ltd., trade name: HZ3600F), and a linear low-density polyethylene (resin composition for polyethylene film layer, density: 0.916 g/cm², MFR: 2.3, produced by Primepolymer Co., Ltd., trade name: SP2020) were coextruded in a ratio of 1:3:1 by inflation film molding to obtain a lamination film. The thickness of the obtained lamination film was 100 μm.

The side of the layer comprising the resin composition of the thus-obtained lamination film (polyethylene film substrate) was irradiated with an electron beam using an electron irradiation device (line-irradiation type irradiation device EZ-CURE, produced by Iwasaki Electric Co., Ltd.) under the following conditions to obtain a laminate in which both sides of the layer comprising the resin composition (polyethylene film substrate) were irradiated with an electron beam and the layer comprising the linear low-density polyethylene (polyethylene film layer) had heat sealability.
Conditions of the Electron Irradiation:
  Electric potential: 110 kV
  Exposure dose: 200 kGy
  Oxygen concentration in device: 100 ppm or less
  Line rate: 25 m/min Example 6-2

A laminate was obtained in the same manner as in Example 6-1, except that the phenolic antioxidant and the phosphorus processing antioxidant in the resin composition were changed to a hydroxylamine antioxidant (produced by BASF Co., Ltd., trade name: Irgastab FS 301FF)

Comparative Example 6-1

A laminate was obtained in the same manner as in Example 6-1, except that electron irradiation was not carried out.

Comparative Example 6-2

A laminate was obtained in the same manner as in Example 6-1, except that the phenolic antioxidant and the phosphorus processing stabilizer in the resin composition were not added.
Evaluation of Heat Sealability
Seal Strength (Immediately after Manufacture)

The laminates immediately after obtained in the above-described Examples and Comparative Examples were cut into 10 cm×10 cm to prepare three sample pieces for each sample. The sample piece was folded in half so that the face side not irradiated with the electron beam, or the side of the layer comprising the linear low-density polyethylene (polyethylene film layer), was inside, and a 1 cm×10 cm area of this sample piece was heat-sealed using a heat-sealing tester at a temperature of 140° C. and a pressure of 1 kgf/cm² for 1 second.

The heat-sealed sample piece was cut in rectangles with a width of 15 mm, and both edges not heat-sealed were grasped by a tensile tester, and the peel strength (N/15 mm) was measured under the conditions where the rate was 300 mm/min and the load range was 50 N. The measurement results were as shown in Table 6 below.

The laminate obtained in Comparative Example 6-2 was melt in heat sealing and thus could not be measured for the seal strength.
Seal Strength (after 6 Months)

The laminates obtained in the above-described Examples and Comparative Examples were stored at a temperature of 40° C. and a relative humidity of 75% for 6 months before cutting it into 10 cm×10 cm to prepare three sample pieces for each sample. The sample piece was folded in half so that the face side not irradiated with the electron beam, or the side of the layer comprising the linear low-density polyethylene (polyethylene film layer), was inside, and a 1 cm×10 cm area of this sample piece was heat-sealed using a heat-sealing tester at a temperature of 180° C. and a pressure of 1 kgf/cm² for 1 second.

The heat-sealed sample piece was cut in rectangles with a width of 15 mm, and both edges not heat-sealed were grasped by a tensile tester, and the peel strength (N/15 mm) was measured under the conditions where the rate was 300 mm/min and the load range was 50 N. The measurement results were as shown in Table 6 below.

The laminate obtained in Comparative Example 6-2 was melt in heat sealing and thus could not be measured for the seal strength.
Gel Fraction The laminates obtained in the above-described Examples and Comparative Examples were cut to 1 g to prepare sample pieces. The sample piece was wrapped with 5 g 400 mesh stainless steel mesh and immersed in 100 ml of xylene at 120° C. for 24 hours. After that, the sample piece wrapped with the stainless steel mesh was dried under vacuum at 80° C. for 16 hours, and then the mass was measured to determine the gel fraction. The measurement results were as shown in Table 6 below.
Color Difference Each of the laminates obtained in the above-described Examples and Comparative Examples were stacked by five, and L*, a* and b* were determined using a spectrophotometer (produced by AS ONE Corporation, trade name: Sefi). The measurement results were as shown in Table 6 below.

TABLE 6

| | Seal Strength (N/15 mm) | | | | | After 6 months | Gel fraction | Color difference | | |
|---|---|---|---|---|---|---|---|---|---|---|
| | Immediately after manufacture | | | | | | | | | |
| | 140° C. | 150° C. | 160° C. | 170° C. | 180° C. | 180° C. | (%) | L* | a* | b* |
| Example 6-1 | 32.9 | 33.1 | 33.9 | 33.1 | 33.3 | 31.3 | 28 | 92.7 | −1.05 | 2.35 |
| Example 6-2 | 32.0 | 32.7 | 32.8 | 33.9 | 33.8 | 31.8 | 35 | 92.5 | −1.10 | 2.30 |
| Comparative Example 6-1 | 31.9 | 32.3 | 32.9 | 32.1 | 31.5 | 20.1 | 27 | 91.0 | −1.75 | 3.95 |
| Comparative Example 6-2 | film melting | | | | | film melting | Unmeasurable due to film melting | 92.71 | −0.70 | 1.53 |

Example 7-1

To a linear low-density polyethylene (density: 0.904 g/cm², MFR: 1.0, produced by Dow Chemical Japan Co., Ltd., trade name: AFFINITY 1881G), a phenolic antioxidant (produced by BASF Co., Ltd., trade name: Irganox 1010/FF) and a phosphorus antioxidant (produced by BASF Co., Ltd., trade name: Irgafos 168/FF) were added in a mass ratio of 1:1 so as to be 5% by mass based on the total mass of a resin composition to be obtained to obtain a resin composition.

The thus-obtained resin composition, a high-density polyethylene (resin composition for shape stabilizing layer, density: 0.959 g/cm², MFR: 1.0, produced by Primepolymer Co., Ltd., trade name: HZ3600F), and a linear low-density polyethylene (resin composition for polyethylene film layer, density: 0.916 g/cm², MFR: 2.3, produced by Primepolymer Co., Ltd., trade name: SP2020) were coextruded by inflation film molding to obtain a lamination film having a thickness of 60 µm.

The side of the layer comprising the resin composition of the thus-obtained lamination film (polyethylene film substrate) was irradiated with an electron beam using an electron irradiation device (line-irradiation type irradiation device EZ-CURE, produced by Iwasaki Electric Co., Ltd.) under the following conditions.

Conditions of the Electron Irradiation:
  Electric potential: 110 kV
  Exposure dose: 200 kGy
  Oxygen concentration in device: 100 ppm or less
  Line rate: 25 m/min The layer comprising the linear low-density polyethylene lamination film irradiated with an electron beam was laminated on a linear low-density polyethylene film having a thickness of 60 µm (polyethylene film layer, produced by Toyobo Co., Ltd., trade name: L-6100) via a two-component urethane adhesive (produced by Rock Paint Co., Ltd., trade name: RU-77T/H-7) to obtain a laminate.

Example 7-2

A laminate was obtained in the same manner as in Example 7-1, except that the phenolic antioxidant and the phosphorus processing antioxidant in the resin composition were changed to a hydroxylamine antioxidant.

Comparative Example 7-1

A laminate was obtained in the same manner as in Example 7-1, except that electron irradiation was not carried out.

Comparative Example 7-2

A laminate was obtained in the same manner as in Example 7-1, except that the phenolic antioxidant and the phosphorus processing stabilizer in the resin composition were not added.

Evaluation of Heat Sealability

Seal Strength (Immediately after Manufacture)

The laminates immediately after obtained in the above-described Examples and Comparative Examples were cut into 10 cm×10 cm to prepare three sample pieces for each sample.

The sample piece was folded in half so that the side of the linear low-density polyethylene film (polyethylene film layer) was inside, and a 1 cm×10 cm area of this sample piece was heat-sealed using a heat-sealing tester at a temperature of 140° C. and a pressure of 1 kgf/cm² for 1 second.

The heat-sealed sample piece was cut in rectangles with a width of 15 mm, and both edges not heat-sealed were grasped by a tensile tester, and the peel strength (N/15 mm) was measured under the conditions where the rate was 300 mm/min and the load range was 50 N. The measurement results were as shown in Table 7 below.

The laminate obtained in Comparative Example 7-2 was melt in heat sealing and thus could not be measured for the seal strength.

Seal Strength (after 6 Months)

The laminates obtained in the above-described Examples and Comparative Examples were stored at a temperature of 40° C. and a relative humidity of 75% for 6 months before cutting it into 10 cm×10 cm to prepare three sample pieces for each sample. The sample piece was folded in half so that the side of the linear low-density polyethylene film (polyethylene film layer) was inside, and a 1 cm×10 cm area of this sample piece was heat-sealed using a heat-sealing tester at a temperature of 180° C. and a pressure of 1 kgf/cm² for 1 second.

The heat-sealed sample piece was cut in rectangles with a width of 15 mm, and both edges not heat-sealed were grasped by a tensile tester, and the peel strength (N/15 mm) was measured under the conditions where the rate was 300 mm/min and the load range was 50 N. The measurement results were as shown in Table 7 below.

The laminate obtained in Comparative Example 7-2 was melt in heat sealing and thus could not be measured for the seal strength.

Gel Fraction

The polyethylene film substrates obtained in the above-described Examples and Comparative Examples were cut to 1 g to prepare sample pieces. The sample piece was wrapped with 5 g 400 mesh stainless steel mesh and immersed in 100 ml of xylene at 120° C. for 24 hours. After that, the sample piece wrapped with the stainless steel mesh was dried under vacuum at 80° C. for 16 hours, and then the mass was measured to determine the gel fraction. The measurement results were as shown in Table 7 below.

Color Difference

Each of the polyethylene-laminated films obtained in the above-described Examples and Comparative Examples were stacked by five, and L*, a* and b* were determined using a spectrophotometer (produced by AS ONE Corporation, trade name: Sefi). The measurement results were as shown in Table 7 below.

TABLE 7

| Table 7 | Seal Strength (N/15 mm) | | | | | After 6 months | Gel fraction | Color difference | | |
|---|---|---|---|---|---|---|---|---|---|---|
| | Immediately after manufacture | | | | | | | | | |
| | 140° C. | 150° C. | 160° C. | 170° C. | 180° C. | 180° C. | (%) | L* | a* | b* |
| Example 7-1 | 31.9 | 40.5 | 53.2 | 61.1 | 62.3 | 61.3 | 27 | 91.7 | −1.05 | 2.25 |
| Example 7-2 | 30.5 | 41.7 | 51.4 | 62.9 | 62.8 | 62.8 | 31 | 92.5 | −1.00 | 2.20 |
| Comparative Example 7-1 | 31.4 | 41.4 | 51.2 | 60.1 | 60.6 | 29.1 | 25 | 91.7 | −1.85 | 4.05 |
| Comparative Example 7-2 | film melting | | | | | film melting | Unmeasurable due to film melting | 92.71 | −0.70 | 1.53 |

Example 8-1

To a linear low-density polyethylene (density: 0.904 g/cm², MFR: 1.0, produced by Dow Chemical Japan Co., Ltd., trade name: AFFINITY 1881G), a styrene-based elastomer (produced by Kuraray Co., Ltd., trade name: HYBRAR 7125) so as to be 20% by mass based on the total mass of a resin composition to be obtained, as well as a phenolic antioxidant (produced by BASF Co., Ltd., trade name: Irganox 1010/FF) and a phosphorus antioxidant (produced by BASF Co., Ltd., trade name: Irgafos 168/FF) in a mass ratio of 1:1 so as to be 5% by mass based on the total mass of a resin composition to be obtained were added to obtain a resin composition.

The thus-obtained resin composition, a high-density polyethylene (resin composition for shape stabilizing layer, density: 0.959 g/cm², MFR: 1.0, produced by Primepolymer Co., Ltd., trade name: HZ3600F), and a linear low-density polyethylene (resin composition for polyethylene film layer, density: 0.916 g/cm², MFR: 2.3, produced by Primepolymer Co., Ltd., trade name: SP2020) were coextruded by inflation film molding to obtain a lamination film having a thickness of 60 μm.

The side of the layer comprising the resin composition of the thus-obtained lamination film (polyethylene film substrate) was irradiated with an electron beam using an electron irradiation device (line-irradiation type irradiation device EZ-CURE, produced by Iwasaki Electric Co., Ltd.) under the following conditions.
Conditions of the Electron Irradiation:
  Electric potential: 110 kV
  Exposure dose: 200 kGy
  Oxygen concentration in device: 100 ppm or less
  Line rate: 25 m/min
The lamination film irradiated with an electron beam was laminated on a linear low-density polyethylene film having a thickness of 60 μm (polyethylene film layer, produced by Toyobo Co., Ltd., trade name: L-6100) via a two-component urethane adhesive (produced by Rock Paint Co., Ltd., trade name: RU-77T/H-7) to obtain a laminate.

Example 8-2

A laminate was obtained in the same manner as in Example 8-1, except that the phenolic antioxidant and the phosphorus processing antioxidant in the resin composition were changed to a hydroxylamine antioxidant (produced by BASF Co., Ltd., trade name: Irgastab FS 301FF)

Comparative Example 8-1

A laminate was obtained in the same manner as in Example 8-1, except that the phenolic antioxidant and the phosphorus processing stabilizer in the resin composition were not added.

Comparative Example 8-2

A laminate was obtained in the same manner as in Example 8-1, except that electron irradiation was not carried out
Evaluation of Heat Sealability
Seal Strength (Immediately after Manufacture)

The laminates immediately after obtained in the above-described Examples and Comparative Examples were cut into 10 cm×10 cm to prepare three sample pieces for each sample. The sample piece was folded in half so that the face side not irradiated with the electron beam, or the linear low-density polyethylene film (polyethylene film layer), was inside, and a 1 cm×10 cm area of this sample piece was heat-sealed using a heat-sealing tester at a temperature of 140° C. and a pressure of 1 kgf/cm² for 1 second.

The heat-sealed sample piece was cut in rectangles with a width of 15 mm, and both edges not heat-sealed were grasped by a tensile tester, and the peel strength (N/15 mm) was measured under the conditions where the rate was 300 mm/min and the load range was 50 N. The measurement results were as shown in Table 8 below.

The laminate obtained in Comparative Example 8-2 was melt in heat sealing and thus could not be measured for the seal strength.
Seal Strength (after 6 Months)

The laminates obtained in the above-described Examples and Comparative Examples were stored at a temperature of 40° C. and a relative humidity of 75% for 6 months before cutting it into 10 cm×10 cm to prepare three sample pieces for each sample. The sample piece was folded in half so that the face side not irradiated with the electron beam, or the linear low-density polyethylene film (polyethylene film layer), was inside, and a 1 cm×10 cm area of this sample piece was heat-sealed using a heat-sealing tester at a temperature of 180° C. and a pressure of 1 kgf/cm² for 1 second.

The heat-sealed sample piece was cut in rectangles with a width of 15 mm, and both edges not heat-sealed were grasped by a tensile tester, and the peel strength (N/15 mm) was measured under the conditions where the rate was 300 mm/min and the load range was 50 N. The measurement results were as shown in Table 8 below.

The laminate obtained in Comparative Example 8-2 was melt in heat sealing and thus could not be measured for the seal strength.

Gel Fraction

The polyethylene film substrates obtained in the above-described Examples and Comparative Examples were cut to 1 g to prepare sample pieces. The sample piece was wrapped with 5 g 400 mesh stainless steel mesh and immersed in 100 ml of xylene at 120° C. for 24 hours. After that, the sample piece wrapped with the stainless steel mesh was dried under vacuum at 80° C. for 16 hours, and then the mass was measured to determine the gel fraction. The measurement results were as shown in Table 8 below.

Color Difference

Each of the laminates obtained in the above-described Examples and Comparative Examples were stacked by five, and L*, a* and b* were determined using a spectrophotometer (produced by AS ONE Corporation, trade name: Sefi). The measurement results were as shown in Table 8 below.

TABLE 8

| Table 8 | Seal Strength (N/15 mm) | | | | | After 6 months | Gel fraction | Color difference | | |
|---|---|---|---|---|---|---|---|---|---|---|
| | Immediately after manufacture | | | | | | | | | |
| | 140° C. | 150° C. | 160° C. | 170° C. | 180° C. | 180° C. | (%) | L* | a* | b* |
| Example 8-1 | 32.9 | 40.1 | 55.9 | 63.1 | 63.3 | 61.3 | 29 | 92.7 | −1.05 | 2.35 |
| Example 8-2 | 32.0 | 42.7 | 52.4 | 63.9 | 63.8 | 62.8 | 34 | 92.5 | −1.10 | 2.30 |
| Comparative Example 8-1 | 31.9 | 42.4 | 52.4 | 62.1 | 61.6 | 30.1 | 26 | 91.0 | −1.75 | 3.95 |
| Comparative Example 8-2 | film melting | | | | | film melting | Unmeasurable due to film melting | 92.71 | −0.70 | 1.53 |

The invention claimed is:

1. A laminate consisting of:
    a polyethylene film substrate comprising polyethylene and a crosslinking agent, wherein the crosslinking agent is at least one crosslinking agent selected from the group consisting of a styrene-polyisoprene elastomer, a styrene-polybutadiene elastomer, a styrene-polyisoprene-butadiene random copolymer, and an ethylene-acrylic ester-glycidyl methacrylate; and
    a polyethylene film layer;
    wherein a content of the crosslinking agent in the polyethylene film substrate is in a range of 10 to 40% by mass,
    wherein both sides of the polyethylene film substrate are irradiated with an electron beam,
    wherein a gel fraction of the polyethylene film substrate is in a range of 20 to 80%, and
    wherein at least one side of the polyethylene film layer opposite to the polyethylene film substrate is not irradiated with the electron beam and has heat sealability.

2. A package comprising the laminate according to claim 1, wherein the side of the polyethylene film layer that is not irradiated with the electron beam or the side of the polyethylene film layer having heat sealability is located on an inside of the package.

* * * * *